(12) United States Patent
Copeland

(10) Patent No.: US 8,944,230 B2
(45) Date of Patent: *Feb. 3, 2015

(54) SEPARATOR SPRING FOR CLUTCH PLATE SEPARATION AND STABILIZATION

(71) Applicant: Allison Transmission, Inc., Indianapolis, IN (US)

(72) Inventor: Kevin A. Copeland, Greenwood, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,584

(22) Filed: Apr. 1, 2013

(65) Prior Publication Data

US 2013/0213759 A1    Aug. 22, 2013

Related U.S. Application Data

(63) Continuation of application No. 12/486,576, filed on Jun. 17, 2009, now Pat. No. 8,408,375.

(60) Provisional application No. 61/073,693, filed on Jun. 18, 2008.

(51) Int. Cl.
| | | |
|---|---|---|
| F16D 13/69 | (2006.01) | |
| F16D 25/0638 | (2006.01) | |
| F16F 1/18 | (2006.01) | |
| F16D 13/52 | (2006.01) | |
| F16D 13/64 | (2006.01) | |

(52) U.S. Cl.
CPC ............... *F16D 13/52* (2013.01); *F16D 13/69* (2013.01); *F16D 13/648* (2013.01)

USPC ............ 192/70.28; 192/85.4; 267/165

(58) Field of Classification Search
CPC ........................................................ F16D 13/69
USPC ............ 192/70.19, 70.28, 85.39, 85.4, 101; 267/165, 166.1

See application file for complete search history.

(56) References Cited

U.S. PATENT DOCUMENTS

| | | | | |
|---|---|---|---|---|
| 1,233,561 A | * | 7/1917 | Dornfeld | ............... 246/487 |
| 1,751,261 A | * | 3/1930 | Wilson | ............... 267/166.1 |
| 1,849,164 A | * | 3/1932 | Wood | ............... 192/70.19 |
| 3,081,854 A | * | 3/1963 | Snyder | ............... 192/70.28 |
| 3,412,834 A | * | 11/1968 | Root | ............... 192/85.51 |
| 3,994,378 A | | 11/1976 | Schwabe et al. | |
| 4,940,124 A | | 7/1990 | Galuska et al. | |
| 6,543,596 B2 | | 4/2003 | Martin et al. | |
| 8,408,375 B2 | * | 4/2013 | Copeland | ............... 192/85.4 |
| 2009/0314601 A1 | | 12/2009 | Copeland | |

FOREIGN PATENT DOCUMENTS

JP        04258527 A        9/1992

OTHER PUBLICATIONS

U.S. Appl. No. 61/073,693, filed Jun. 18, 2008, 19 pages.

* cited by examiner

*Primary Examiner* — Richard M. Lorence
(74) *Attorney, Agent, or Firm* — Barnes & Thornburg LLP

(57) ABSTRACT

A clutch assembly includes a plurality of reaction plates separated by one or more separator springs to maintain a distance between the reaction plates when the clutch is not activated.

20 Claims, 5 Drawing Sheets

SEPARATOR SPRING FOR CLUTCH PLATE SEPARATION AND STABILIZATION

CROSS REFERENCE TO RELATED APPLICATION

This application is a continuation application of U.S. application Ser. No. 12/486,576, entitled "SEPARATOR SPRING FOR CLUTCH PLATE SEPARATION AND STABILIZATION," which was filed on Jun. 17, 2009, and which claims priority to U.S. Provisional Patent Application No. 61/073,693, filed Jun. 18, 2008, the entirety of both of which is incorporated herein by reference.

BACKGROUND OF THE INVENTION

The present disclosure is related to clutch assemblies of the type used in vehicle transmissions. More specifically, the present disclosure is related to clutch assemblies which have multiple reaction plates and multiple friction plates interposed between the reaction plates.

The use of clutch assemblies to selectively transfer rotational motion between a power source and a driven member facilitates efficient and smooth acceleration of a vehicle. By selectively engaging multiple stages of clutch assemblies within a transmission, the ratio of input rotation to output rotation is varied to smoothly accelerate the vehicle. When the reaction plates and friction plates of a clutch assembly are not engaged, spacing between the reaction plates and the friction plates provides a gap in which the reaction plates are free to move. Movement of the reaction plates while the input is rotating results in contact between the reaction plates and the friction plates which may cause heat, friction losses, or damage or unnecessary wear to either the reaction plates or the friction plates. In some instances, plates may "flutter" causing excessive movement of the plates, thereby causing very high friction loss and heat.

SUMMARY OF THE INVENTION

The present disclosure describes one or more of the features recited in the appended claims and/or the following features which, alone or in any combination, may comprise patentable subject matter:

A clutch assembly includes an input and a plurality of friction plates coupled to the input. The clutch assembly further includes an output and a plurality of reaction plates coupled to the output. The friction plates are interposed between the reaction plates. The clutch assembly also includes an actuator configured to act on the plates to urge the reaction plates together to cause the reaction plates to engage the friction plates and transfer torque between the friction plates and the reaction plates. When the actuator is acting on the reaction plates torque from the input is transferred through the clutch assembly to the output.

In one embodiment, the clutch assembly comprises a separator spring configured to be coupled to the plurality of reaction plates. In some embodiments, the separator spring may be coupled to the friction plates including friction pads. The separator spring includes a plurality of first portions and a plurality of second portions, the second portions coupled to the first portions. The first portions are each configured to engage with a flange of one of the plates to secure the first portions to the plates. The second portions are biased to maintain a predetermined first distance between the plurality of first portions when the actuator is de-energized. The second portions are deflectable under load to a second distance between the first portions when the actuator is energized.

The first portion may comprise a clamp and a pair of grips coupled to the clamp. The grips may engage opposite faces of a plate. The clamp may be biased to urge the grips to a closed position. The first portion may be frictionally retained on the plate.

The second portion may comprise a bias member and a pair of legs coupled to the bias member. The bias member may be configured to urge the legs apart. The separator spring may be configured such that each grip of each first portion is coupled to a leg of a second portion. The action of the bias member on the legs may tend to urge adjacent reaction plates apart. The spring rate of the bias members may be configured to allow the force of the actuator to overcome the spring rate of the bias members to allow the reaction plates to engage the friction plates. The spring rate of the bias member may also be sufficient to urge the plates apart when the actuator is de-energized.

According to another aspect of the disclosure, the separator spring may comprise a plurality of first portions, each of the first portions configured to engage a flange of one of the plurality of plates and a plurality of second portions, each of the second portions interposed between a pair of the first portions and coupled thereto, the second portions biased to maintain a predetermined first distance between the first portions when the clutch assembly is released and the second portions deflectable to a second distance between the first portions smaller than the first distance.

In some embodiments, the clutch assembly may include a plurality of separator springs, each separator spring including a first portion and a second portion. The first portion may be coupled to a flange of a first plate and the second portion may engage the flange of a second plate. The separator springs may be embodied as conical springs.

In some embodiments, a clutch assembly may include a plurality of separator springs. The separator springs may be positioned at multiple positions about the circumference of the plates to balance the bias of the separator springs on the plates.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
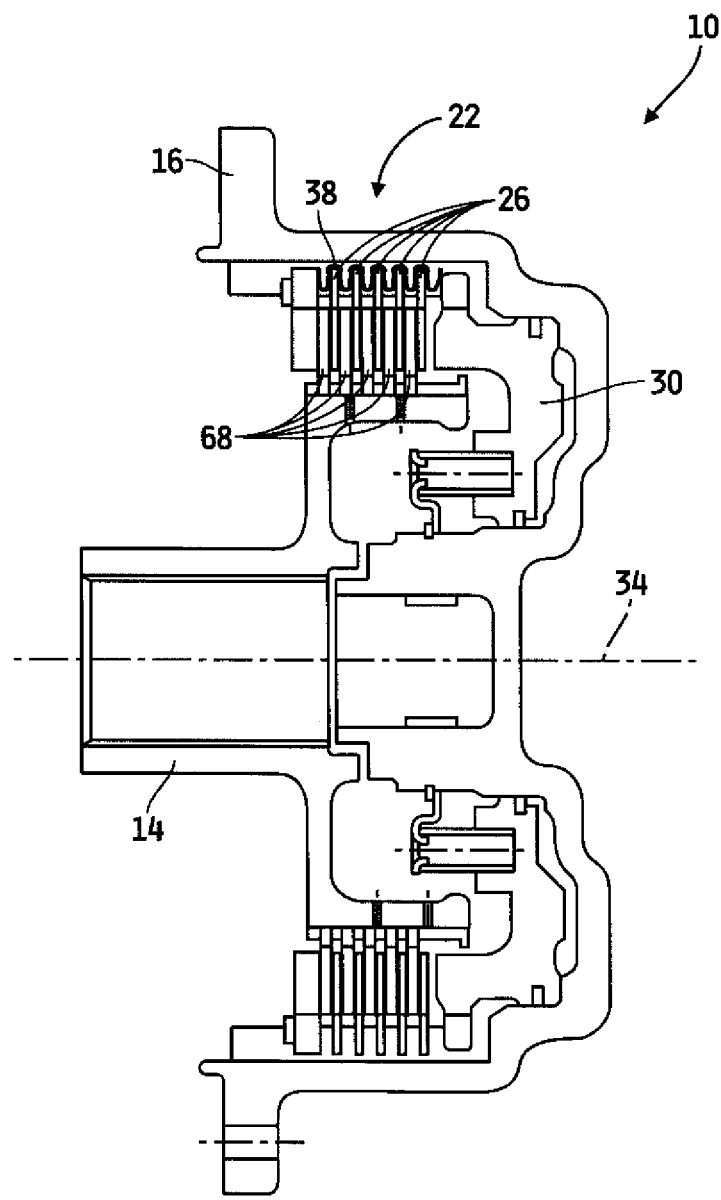
FIG. 1 is diagrammatic representation of a cross-sectional view of a portion of an automatic transmission.

A portion of an automatic transmission 10 for a vehicle includes a clutch pack 22 selectively engageable to vary the ratio of the speed of a rotating hub 14 relative to a housing 16 of the automatic transmission 10 as shown in FIG. 1. The clutch pack 12 includes a group of reaction plates 26 which are keyed to the housing 16 of the transmission 10. The reaction plates 26 are fixed to the housing 16 such that engagement of an actuator 30 causes the rotating hub 14 and the housing 16 through the reaction plates 26 to engage a group of friction plates 68 to transfer torque between the reaction plates 26 and the friction plates 68 as is well known in the art. Rotating hub 14 rotates about a drive axis 34.

Figure 2:
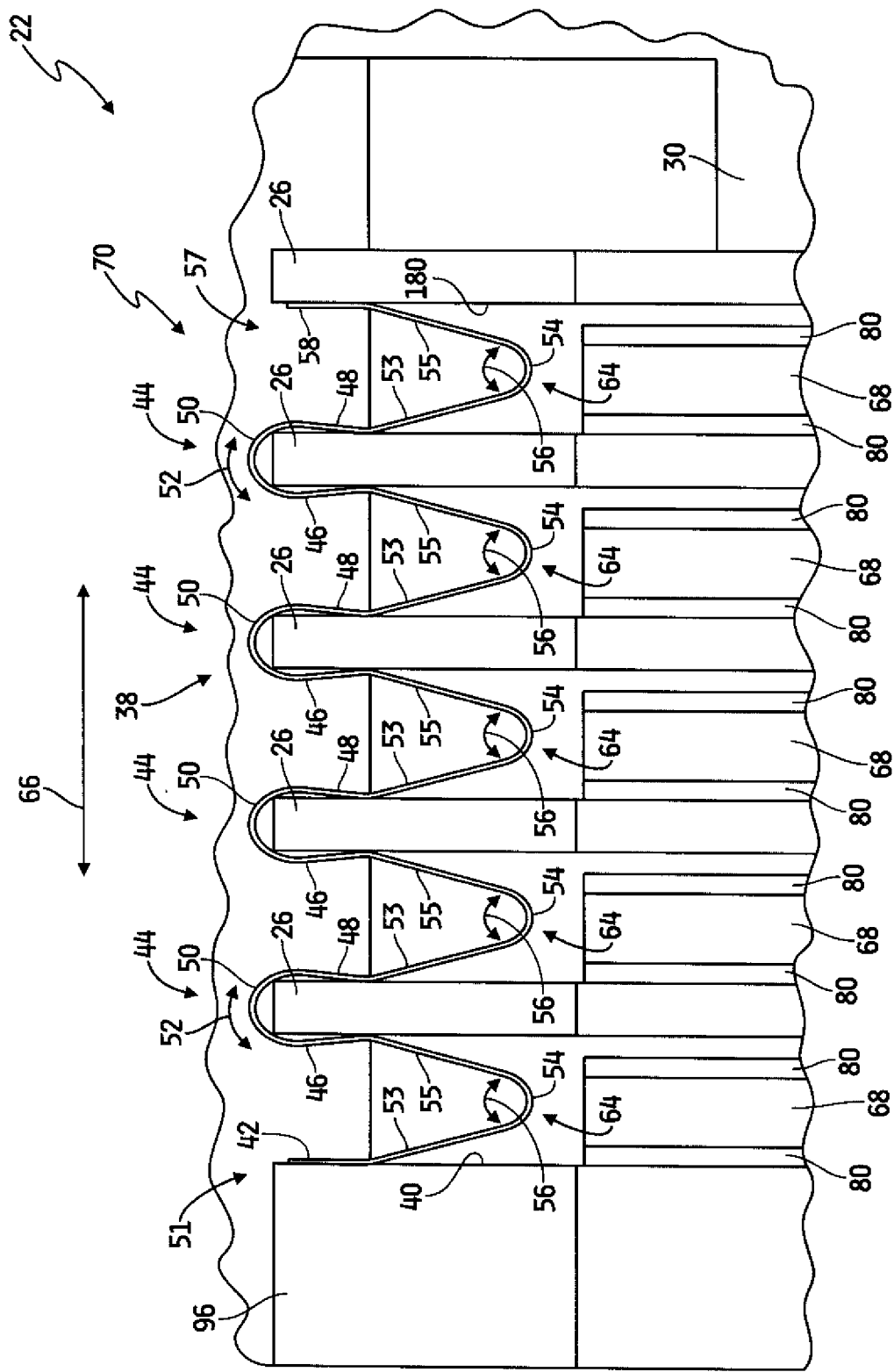
FIG. 2 is a side view of a portion of clutch pack which includes a plurality of reaction plates and a plurality of friction plates, the plurality of reaction plates being separated by a first embodiment of a separator spring.
Figure 4:
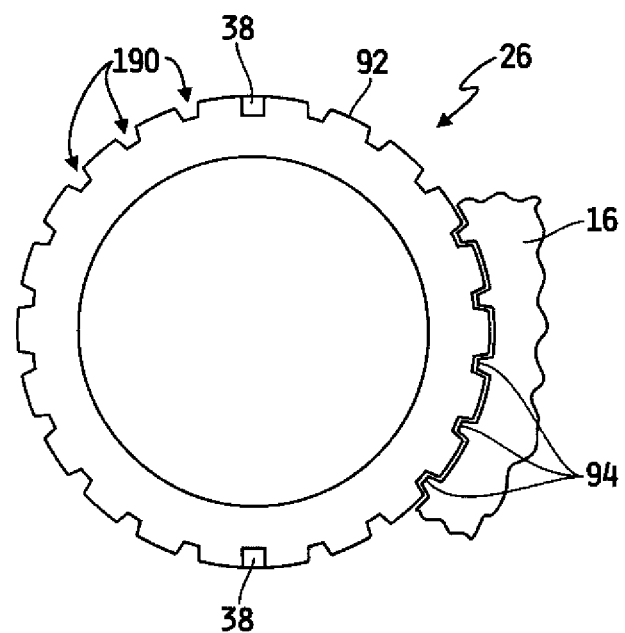
FIG. 4 is a side view of a reaction plate having two separator springs attached to the outer perimeter of the reaction plate.

The reaction plates 26 of clutch pack 22 have a separation spacing between the adjacent reaction plates 26 maintained by a separator spring 38. A plurality of friction plates 68 is interposed between the reaction plates 26 as shown in FIG. 2. When the clutch pack 22 is acted upon by an actuator 30 by moving the actuator 30 from left to right in FIGS. 1 and 2, the clutch pack 22 is compressed thereby causing the reaction plates 26 to engage the friction plates 68 to transfer torque from the friction plates 68 to the reaction plates 26. The reaction plates 26 are coupled to the housing 16. Referring to FIG. 4, the reaction plates 26 illustratively include a plurality of notches 190 which are formed in an outer perimeter 92 of the reaction plates 26. The housing 16, partially shown in FIG. 4, illustratively has a plurality of splines 94 which engage the notches 190 of the reaction plates 26. In other embodiments, the reaction plates 26 may be alternatively coupled to the housing 16 using other conventional coupling mechanisms and/or techniques.

Figure 3:
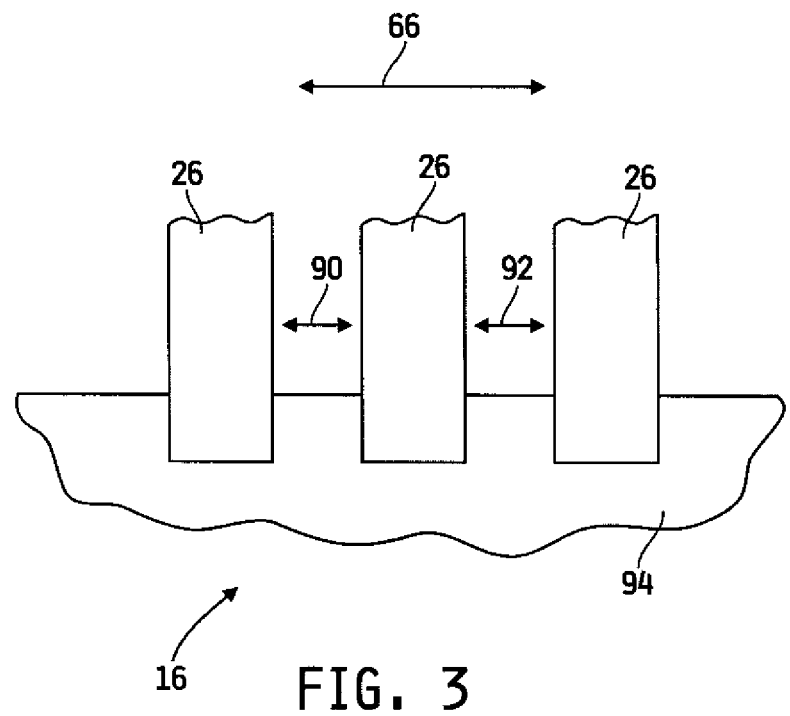
FIG. 3 is a side view of the engagement of a reaction plate with a spline of a housing.

Friction plates 68 are coupled to the rotating hub 14 which is driven such that rotation of the rotating hub 14 causes the friction plates 68 to rotate about the drive axis 34. When the reaction plates 26 are engaged with a spline 94 of the housing 16, clearance is provided between adjacent reaction plates 26 to allow the reaction plates 26 to float relative to the housing 16 along the drive axis 34 as suggested by arrows 90 and 92 in FIG. 3. Movement of the reaction plates 26 along the splines 94 prevents binding of the reaction plates 26 when the clutch pack 22 is engaged and allows the reaction plates 26 to fully engage the friction plates 68 when the actuator 30 is energized. It should be understood that the rotating hub 14 and thereby the friction plates 68 rotate about drive axis 34 during the operation of the transmission 10 when the actuator 30 is de-energized. At high rotating speeds, clearance between the reaction plates 26 and the housing 16 can cause the plates 26 to experience vibration. Vibration of the reaction plates 26 due to vibration in the transmission 10 can cause the reaction plates 26 to contact friction plates 68 even when the actuator 30 is de-energized. In some situations reaction plates 26 may experience excessive vibration known as "flutter." In other situations or configurations, friction plates 68 may "flutter." Contact between the reaction plates 26 and friction plates 68 when the clutch pack 22 is not engaged may result in unnecessary friction, horsepower loss, increased temperature and/or premature wear of the transmission 10.

Referring again now to FIG. 2, the clutch pack 22 is shown to include a separator spring 38 which is coupled to the reaction plates 26 and engaged with a surface 40 of a backing plate 96, the backing plate 96 secured to the housing 16. The separator spring 38 is illustratively formed of a continuous piece of spring steel and is formed to include a plurality of first portions 44 configured to engage the reaction plates 26 and a plurality of second portions 64, the second portions 64 interposed between the first portions 44 and configured to maintain a spacing between the first portions 44 when the clutch pack 22 is de-energized. The actuator 30 compresses or releases the clutch pack 22 by moving along the drive axis 34 as indicated by the arrow 66. When the actuator 30 is engaged, the reaction plates 26 engage the friction plates 68 and thereby transfer torque from the housing 16 to the rotating hub 14. In the illustrative embodiment, the reaction plates 26 lock the friction plates 68 to prevent rotation of the rotating hub 14. In other embodiments, the engagement of a clutch pack may transfer rotation from one planetary gear set of a transmission to another portion of the transmission. In either case, the application of a separator spring such as separator spring 38 to a set of reaction plates or a set of friction plates maintains spacing within the clutch pack to prevent unintended contact between the friction plates and reaction plates. It should be understood that in some embodiments, the separator spring 38 may be coupled to friction plates 68. In other embodiments, one separator spring 38 may be coupled to the reaction plates 26 and another separator spring 38 may be coupled to the friction plates 68 in the same clutch pack 22.

It is contemplated that a plurality of springs 38 will be disposed about the circumference of the reaction plates 26 as shown diagrammatically in FIG. 4. For example, two or more springs may be equally spaced about the circumference of the reaction plates 26 to maintain a balanced load on the reaction plates 26. It should also be understood that the spring rate of the separator springs 38 may be selected based on the number of springs positioned about the circumference of reaction plates 26 such that the overall return force of the separator springs 38 is appropriate.

Referring again now to FIG. 2, the separator spring 38 includes a tang 42 positioned to engage the surface 40 of the backing plate 96. The tang 42 is coupled to a second portion 64 such that the second portion 64 acts on the tang 42 to bias the tang 42 to engage the surface 40. Each second portion 64 comprises a bias member 54 and a pair of legs 53 and 55 coupled to the bias member 54 on opposite sides thereof. The bias member 54 tends to urge the legs 53 and 55 apart as suggested by an arrow 52 in FIG. 2. The tang 42 is coupled to a leg 53 of one of the second portions 64 and positioned at a first end 51 of the separator spring 38 and terminates the separator spring at end 51. Each first portion 44 is coupled to a pair of second portions 64 positioned on opposite sides of each first portion 44. Each first portion 44 includes a pair of grips 46 and 48 coupled to a clamp 50. The clamp 50 biases grips 46 and 48 to engage the reaction plate 26 as suggested by arrow 56. Thus, while clamp 50 biases grips 46 and 48 together to frictionally engage a reaction plate 26, bias members 54 of the second portions 64 urge each of the first portions 44 apart to define a separation space between the reaction plates 26. Each grip 46 of each first portion 44 is coupled to a leg 55 of the second portions 64. Similarly, each grip 48 of the each first portion 44 is coupled to a leg 53 of a second portion 64. A second tang 58 is positioned at a second end 57 of the separator spring 38. The tang 58 engages a surface 180 on the outer reaction plate 26. The tangs 42 and 58 terminate the spring 38 with tang 42 being coupled to a leg 53 of a second portion 64 at the first end 51 of separator spring 38 and the tang 58 coupled to an leg 55 of the second portion 64 at the second end 57 of the separator spring 38. It should be understood that the separation spring 38 as described herein is symmetrical when viewed from the side. Thus, the reference to the tangs 42 and 58 is for clarity only and does not imply that separation spring 38 may only be assembled to the clutch assembly 70 in a particular orientation.

As actuator 30 acts on clutch pack 22, the cumulative spring rate/bias force of bias members 54 is overcome to allow the reaction plates 26 to engage the friction pads 80 coupled to each of the friction plates 68. The force of actuator 30 is sufficient to overcome the cumulative spring rate of the bias members 54 when the actuator 30 is activated. However, when the actuator 30 is deactivated, the bias members 54 urge the reaction plates 26 apart to define a regular spacing between the reaction plates 26 such that the reaction plates 26 do not engage the friction pads 80 of the friction plates 68.

Figure 7:
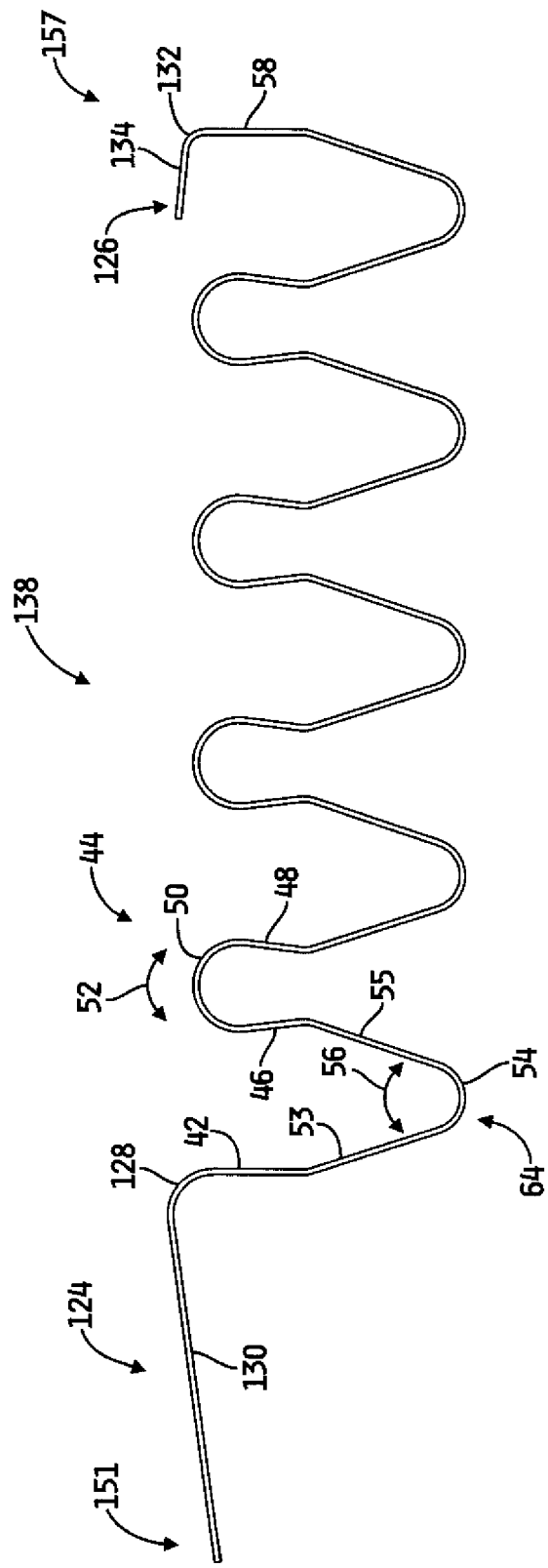
FIG. 7 is a side view of yet another embodiment of a separator spring.

In another embodiment shown in FIG. 7, a separator spring 138 is configured similarly to separator spring 38 but is asymmetrical and formed to include a tab 124 at an end 151 and a tab 126 at an end 157. The tab 124 includes a curved portion 128 coupled to a tang 42 and an arm 130 coupled to the curved portion 128. The tab 124 extends outwardly away from the remainder of the separator spring 138 and is positioned to engage the backing plate 96 to provide a visual indication of the presence of separator spring 138. The tab 126 includes a curved portion 132 coupled to a tang 58 and an arm 134 coupled to the curved portion 132. The tab 126 extends inwardly toward the remainder of separator spring 138 to prevent improper assembly of the separator spring 138 onto the reaction plates 26. The tabs 124 and 126 each engage the housing 16 when the clutch pack 22 is assembled to thereby maintain the separator spring 138 in position on the reaction plates 26. In addition, tab 124 provides an indication to an installer that the separator spring 138 is installed.

The dimensions of separator springs 38 and 138 and the material properties of the spring steel used therein may be varied to a particular clutch application and any discussions of dimensions herein should not be considered limiting. In the illustrative separator spring 38, the bias member 54 has a nominal radius of about 1.00 mm. In some embodiments, the bias member 54 has a nominal radius of about 1.25 mm. Similarly, the clamp 50 of the first portion 44 has a nominal radius of about 1.32 mm. Generally, the clamp 50 is configured to secure the grips 46 and 48 onto a reaction plate 26 having a thickness of between about 2.41 mm and 2.59 mm. In the illustrative embodiment having five reaction plates 26, the spring rate of the bias member 54 results in about 1.8 to 2.0 pounds of force when the actuator 30 is de-energized. In this condition, the reaction plates 26 are maintained at a spacing of about 4.43 mm to about 4.79 mm. When the actuator 30 is energized, the spacing between the reaction plates 26 is reduced to about 3.62 mm to 4.06 mm. It should be understood that the number of the first portions 44 and the second portions 64 may be increased or decreased as necessary for a particular clutch assembly.

The illustrative separator spring 138 comprises a ASTM A-666 type 301 full hard stainless steel strip having a nominal width of about 7.24 mm and a nominal thickness of about 0.20 mm. The illustrative separator spring 138 has a nominal tensile strength of about 1.38 MPa and a nominal hardness of about 40 on the Rockwell C scale. The separator spring 138 is stress relieved at 370° C. after forming. In the illustrative separator spring 138, the clamps 50 have a nominal radius of about 1.41 mm and the bias members 54 have a nominal radius of about 1.1 mm. In an unloaded condition, the bias members 54 exert a separation force of about 3.3 to about 4.5 N. While the illustrative embodiments have been discussed in detail, it should be understood that the characteristics of the separator springs 38 and 138 may be varied as necessary to meet the requirements of various applications.

Figure 5:
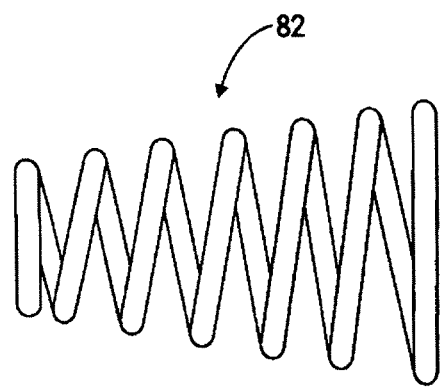
FIG. 5 is a side view of a second embodiment of separator spring.
Figure 6:
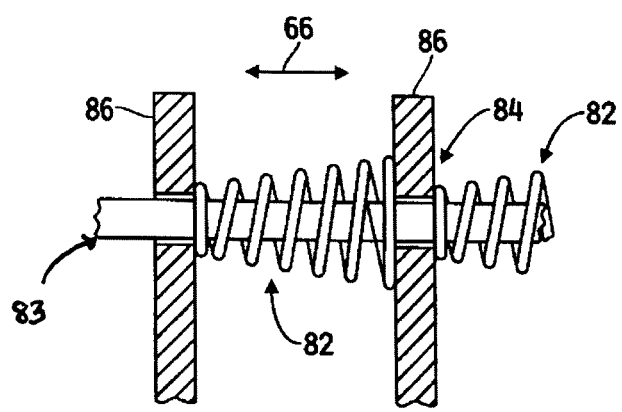
FIG. 6 is a side view of a portion of clutch assembly including the separator spring of FIG. 5.

In yet another embodiment, separator spring 38 is omitted and replaced with a plurality of conical springs 82 as shown in FIGS. 5 and 6. Each conical spring 82 is positioned between adjacent reaction plates 86. A rod 83 is positioned to extend through apertures 84 in each of the reaction plates 86 and through each conical spring 82. The rod 83 is configured to support the springs 82 and maintain the position of each spring 82 relative to the reaction plates 86. Each spring 82 is configured to engage an adjacent reaction plate 86 to maintain spacing between the reaction plates 86 when actuator 30 is released. When actuator 30 is activated, the bias of conical springs 82 is overcome such that the reaction plates 86 engage the friction pads 80 of the friction plates 68 such that the rotation of reaction plates 86 is transferred to friction plates 68 and thereby the output 32.

Although certain illustrative embodiments have been described in detail above, variations and modifications exist within the scope and spirit of this disclosure as described and as defined in the following claims.

The invention claimed is:

1. A clutch assembly comprising
a plurality of friction plates,
a plurality of reaction plates, at least one of the reaction plates interposed between the friction plates,
an actuator configured to act on the reaction plates to urge the reaction plates together to engage the friction plates to transfer torque from the reaction plates to the friction plates, the plurality of friction plates and the plurality of reaction plates positioned between the actuator and a backing plate of the clutch assembly, and
a separator spring coupled to the plurality of reaction plates, the separator spring including (i) a plurality of first portions, each of the first portions engaged with a different one of the plurality of reaction plates and comprising a clamp and a pair of grips coupled to the clamp, the grips engaging surfaces on opposite faces of a reaction plate, (ii) a plurality of second portions coupled to the first portions, the second portions biased to maintain a predetermined first distance between the first portions when the actuator is de-energized and deflectable to a second distance smaller than the first distance when the actuator is energized, (iii) a first tang that defines one end of the separator spring, the first tang engaged with a surface of the backing plate, and (iv) a second tang that defines an opposite end of the separator spring, the second tang engaged with one of the reaction plates.

2. The clutch assembly of claim 1, wherein the first tang is coupled to one of the second portions such that the second portion biases the first tang to engage the surface of the backing plate.

3. The clutch assembly of claim 2, wherein the second tang is coupled to one of the second portions.

4. The clutch assembly of claim 1, wherein the clamp of each first portion is biased to urge the grips closed to retain the first portion of the reaction plate.

5. The clutch assembly of claim 4, wherein each of the second portions comprises a bias member and a pair of legs coupled to the bias member biased to urge the legs of the second portion apart.

6. The clutch assembly of claim 5, wherein the backing plate is coupled to a housing of the clutch assembly.

7. The clutch assembly of claim 6, wherein each grip of each first portion is coupled to a leg of second portion.

8. The clutch assembly of claim 7, wherein the bias member acts on the legs to thereby urge adjacent reaction plates apart.

9. The clutch assembly of claim 8, wherein the spring rate of the bias member is configured to be overcome by the actuator acting on the clutch assembly to urge the reaction plates to engage the friction plates and the spring rate of the bias member is configured to overcome the actuator to separate the plates when the actuator is de-energized.

10. A separator spring for a clutch assembly including a plurality of reaction plates and a plurality of friction plates, the separator spring comprising
- a plurality of first portions, each of the first portions configured to engage one of the plurality of reaction plates and including a clamp and a pair of grips coupled to the clamp, the grips configured to engage surfaces on opposite faces of a reaction plate,
- a plurality of second portions, at least one of the second portions interposed between a pair of the first portions and coupled thereto, the second portions biased to maintain a predetermined first distance between the first portions when the clutch assembly is de-energized and the second portions deflectable to a second distance smaller than the first distance when the clutch assembly is energized,
- a first tab that defines one end of the separator spring, the first tab configured to engage a surface of a backing plate of the clutch assembly, and
- a second tab that defines an opposite end of the separator spring, the second tab configured to engage a housing of the clutch assembly.

11. The separator spring of claim 10, wherein the backing plate is coupled to the housing such that the first tab is engaged with the housing.

12. The separator spring of claim 10, wherein the first tab includes a first tang, a first curved portion coupled to the first tang, and a first arm coupled to the first curved portion.

13. The separator spring of claim 12, wherein the second tab includes a second tang, a second curved portion coupled to the second tang, and a second arm coupled to the second curved portion.

14. The separator spring of claim 13, wherein the first tab is engaged with the surface of the backing plate to provide a visual indication that the separator spring is installed in the clutch assembly.

15. The separator spring of claim 14, wherein each of the second portions comprises a bias member and a pair of legs coupled to the bias member biased to urge the legs of the second portions apart.

16. The separator spring of claim 15, wherein each grip of each first portion is coupled to a leg of each second portion.

17. The separator spring of claim 16, wherein the first tang is coupled to the leg of one of the second portions and the second tang is coupled to the leg of another one of the second portions.

18. A clutch assembly comprising
- a plurality of friction plates,
- a plurality of reaction plates, at least one of the reaction plates interposed between the friction plates,
- an actuator configured to act on the reaction plates to urge the reaction plates together to engage the friction plates to transfer torque from the reaction plates to the friction plates, and
- a separator spring comprising (i) a plurality of first portions, each of the first portions configured to engage one of the plurality of reaction plates and including a clamp and a pair of grips coupled to the clamp, the grips engaging surfaces on opposite faces of a reaction plate, (ii) a plurality of second portions, at least one of the second portions interposed between a pair of the first portions and coupled thereto, the second portions biased to maintain a predetermined first distance between the first portions when the clutch assembly is de-energized and the second portions deflectable to a second distance smaller than the first when the clutch assembly is energized, and (iii) a first tab that defines one end of the separator spring, the first tab engaged with a surface of a backing plate of the clutch assembly.

19. The clutch assembly of claim 18, wherein the separator spring further comprises a second tab configured to engage a housing of the clutch assembly that defines an opposite end of the separator spring.

20. The clutch assembly of claim 19, wherein (i) the first tab includes a first tang, a first curved portion coupled to the first tang, and a first arm coupled to the first curved portion and (ii) the second tab includes a second tang, a second curved portion coupled to the second tang, and a second arm coupled to the second curved portion.

* * * * *